(12) United States Patent
Molnar et al.

(10) Patent No.: US 6,683,859 B1
(45) Date of Patent: Jan. 27, 2004

(54) METHOD AND APPARATUS FOR ECHO CANCELLATION UPDATES IN A MULTICARRIER TRANSCEIVER SYSTEM

(75) Inventors: Peter R. Molnar, Austin, TX (US); Takao Inoue, Austin, TX (US); Matthew A. Pendleton, Cedar Park, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/438,619

(22) Filed: Nov. 12, 1999

(51) Int. Cl.$^7$ ............................................... H04B 3/20
(52) U.S. Cl. ....................................... 370/286; 370/289
(58) Field of Search ........................ 370/352, 285–291, 370/222, 516; 375/222, 260, 350; 379/410, 406.01, 406.08, 219

(56) References Cited

U.S. PATENT DOCUMENTS

| | | | |
|---|---|---|---|
| 4,760,596 A | * 7/1988 | Agrawal et al. | 370/291 |
| 5,117,418 A | * 5/1992 | Chaffee et al. | 370/289 |
| 5,317,596 A | 5/1994 | Ho et al. | 375/14 |
| 5,410,595 A | 4/1995 | Park et al. | 379/410 |
| 5,742,527 A | 4/1998 | Rybicki et al. | 364/705.05 |
| 5,909,463 A | 6/1999 | Johnson et al. | 375/220 |
| 6,097,763 A | * 8/2000 | Djokovic et al. | 375/260 |
| 6,353,629 B1 | * 3/2002 | Pal | 375/222 |
| 6,421,377 B1 | * 7/2002 | Langberg et al. | 375/222 |

* cited by examiner

*Primary Examiner*—Chi Pham
*Assistant Examiner*—Prenell Jones

(57) ABSTRACT

An echo canceler (34) includes a summing device (104) that subtracts a correction signal from a received signal, the difference of which represents the far-end signal with an error component. Instead of adapting its coefficients using the output of the summing device (104), the echo canceler (34) uses the difference between the input and output of a decision device (108) as an estimate of the error component alone. The estimate of the error component is then used to adapt the coefficients according to the adaptive least mean squares (LMS) algorithm. In one embodiment, the decision device (108) forms discrete multi-tone symbols based on the equalized output of the summing device. In this embodiment, the echo canceler (34) performs an inverse of the equalization step efficiently by replacing a division operation with a multiply operation and a corresponding power-of-two shift operation.

14 Claims, 3 Drawing Sheets

METHOD AND APPARATUS FOR ECHO CANCELLATION UPDATES IN A MULTICARRIER TRANSCEIVER SYSTEM

FIELD OF THE INVENTION

This invention relates generally to communication systems, and more particularly to echo cancellation in communication systems.

BACKGROUND OF THE INVENTION

In order to make high data rate interactive services such as video and internet access available to more residential and small business customers, high-speed data communications paths are required. Although fiber optic cable is the preferred transmission media for such high data rate services, it is not readily available in existing communication networks and the expense of installing fiber optic cabling is prohibitive. Current telephone wiring connections, which consist of copper twisted-pair media, were not originally designed to support the data rates or bandwidth required for interactive services such as video on demand or even high speed internet connections. Asymmetric Digital Subscriber Line (ADSL) technology has been developed to increase the effective bandwidth of existing twisted-pair connections, allowing interactive services to be provided without requiring the installation of fiber optic cable.

Discrete multi-tone (DMT) is a multi-carrier technique that divides the available bandwidth of twisted-pair copper media connections into mini-subchannels or bins. The DMT technique has been adopted in the American National Standards Institute (ANSI) T1.413-1998 standard (ADSL standard). In the ADSL standard, DMT is used to generate up to 250 separate 4.3125 kilohertz subchannels from 26 kilohertz to 1.1 megahertz for downstream transmission to an end user. Likewise, DMT is used to generate 26 subchannels from 26 kilohertz to 138 kilohertz for upstream transmission by an end user. The asymmetric transmission protocol implemented by the ADSL standard generally has a higher rate of data transmission from a central office to a remote terminal and a lower rate of data transmission from a remote terminal to a central office. As a result, different processing sequences are required at the remote terminal and central office ends.

One of the problems that ADSL systems must address is the problem of echo. Echo occurs when the frequency spectra of the upstream and downstream signals overlap. Such overlapping spectra are possible in some implementations of ADSL. However, it is possible to cancel some or most of this echo by using digital signal processing (DSP) techniques. Using this technique the transmit signal which causes the echo is used to estimate the echo component of a received signal. This estimated echo component is then subtracted from the received signal to form an estimate of the true far-end signal.

These systems conventionally have a training period at startup during which the characteristics of the channel are modeled. More sophisticated systems not only perform training at startup, but also adapt the coefficients continually. This adaptive echo cancellation allows for changes in parameters over time. For example, as transmission takes place a transmission line coupler will typically heat up. The result of this heating is that its characteristics change, so that the coefficients developed during the training period may no longer accurately cancel the echo.

In particular, the adaptation is made difficult by the fact that the coefficient update will be performed using the sum of the echo and the far-end signal. Over sufficiently long periods of time, the average value of the received signal will be approximately zero, and thus the adaptation will be carried out using only the echo component of the signal. However, the receive signal only averages to zero over a relatively long period of time. Furthermore, there may be a bias in the receive signal such that the average value is not truly equal to zero. Thus it would be desirable to perform the coefficient update of an echo canceler based on only the echo signal, without the receive signal. Such an apparatus and method is provided by the present invention, whose features and advantages will be more clearly understood from the following detailed description taken in conjunction with the accompanying drawings.

DETAILED DESCRIPTION OF A PREFERRED EMBODIMENT

Figure 1:
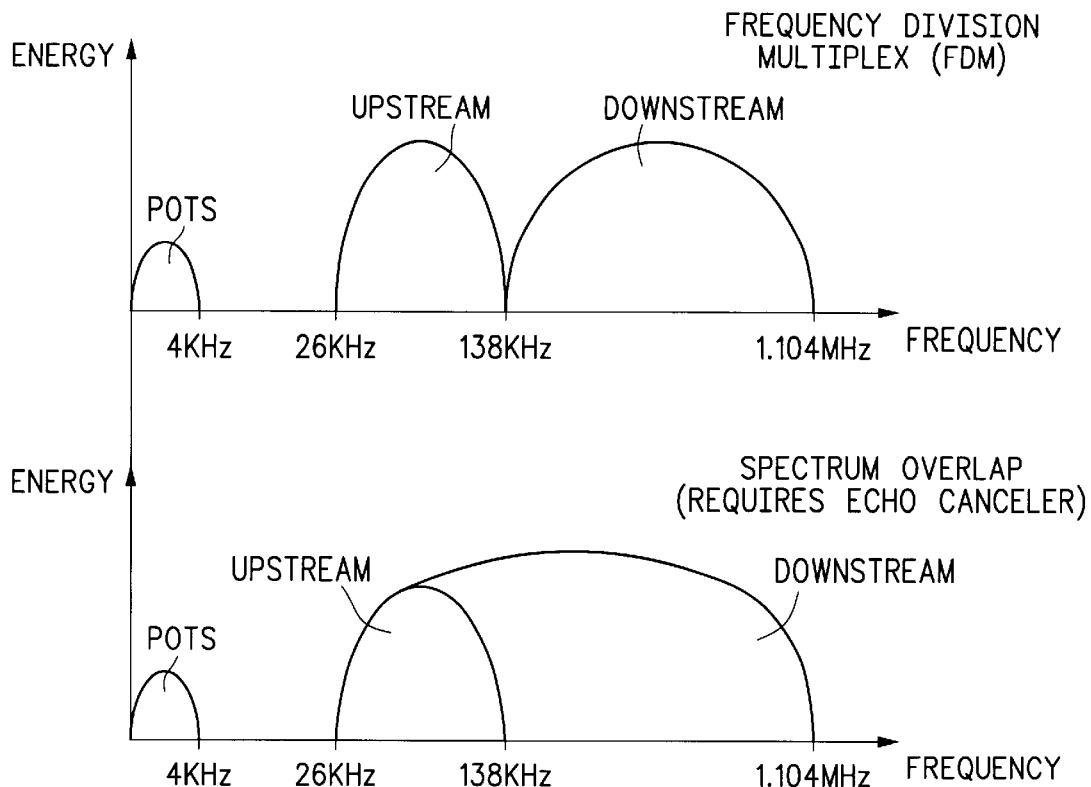
FIG. 1, illustrates, in graphical form, the frequency spectra of two alternative implementations of the ADSL standard.

FIG. 1 illustrates, in graphical form, the frequency spectra of two alternative implementations of the ADSL standard. In the graphs of both implementations, the vertical axis represents energy and the horizontal axis represents frequency. The first graph represents the frequency division multiplex (FDM) option of the ADSL standard. In this option, the lowest end of the frequency spectrum is used for ordinary voice telephone transmission and reception (POTS). This use of the spectrum takes place in the frequency range of between 0 and 4 kilohertz (kHz). Since the ADSL system is asymmetrical, there is a different frequency requirement between the upstream and the downstream channels. Thus, the upstream channel occupies the frequency spectrum between 26 kilohertz and 138 kHz, whereas the downstream channel occupies the frequency spectrum of between 138 kilohertz and 1.104 megahertz (MHz). Using this option, there is no need for echo cancellation, and the upstream and downstream signals may be separated by ordinary filtering.

Shown below the FDM frequency spectrum is the spectrum overlap option, in which the upstream and downstream channels overlap. As before, the POTS spectrum occupies the band between 0 and 4 kHz. However, the upstream and downstream spectra overlap. The upstream channel still occupies the frequency band between 26 kilohertz and 138 kilohertz. However using this option, the downstream channel occupies a spectrum that overlaps the upstream spectrum, between 26 kHz and 1.104 MHz. The advantage of this option is that the spectrum may be utilized more efficiently. However, it also requires both the remote terminal and the central office transceivers to implement echo cancellation to receive the correct data.

Figure 2:
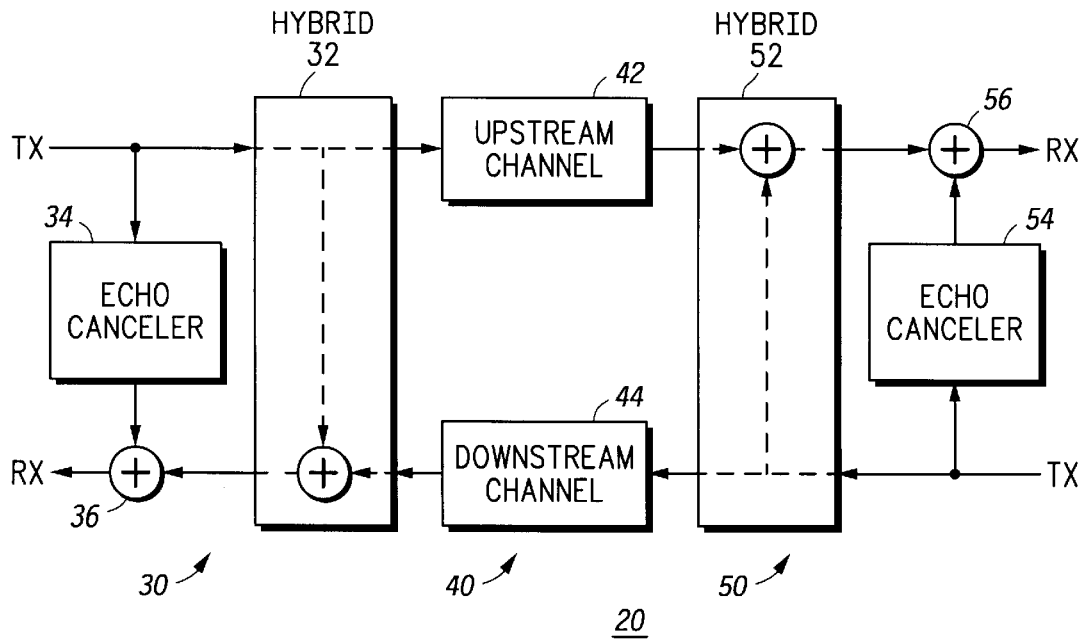
FIG. 2 illustrates, in block diagram form, a transceiver system using an adaptive echo canceler.

FIG. 2 illustrates, in block diagram form, an ADSL system 20 according to the present invention. ADSL system 20 includes generally a remote terminal (RT) transceiver 30 and a central office (CO) transceiver 50 that communicate via a transmission line 40. As illustrated in FIG. 2, transmission line 40 includes an upstream channel 42 and a downstream channel 44. However, it should be appreciated that these channels are broken out for the purposes of understanding the present invention and are actually co-existent on a single twisted pair transmission line.

RT transceiver 30 includes a transmission line hybrid 32, an echo canceler 34, and a summing device 36. Hybrid 32 connects the four wires formed by the two-wire transmit signal path and the two-wire receive signal path into one twisted pair transmission line 40. Echo canceler 34 has a signal input for receiving a transmit signal labeled "TX", and an output. Summing device 36 has a positive input terminal connected to the output of hybrid 32, a negative input terminal coupled to the output of echo canceler 34, and an output terminal for providing a receive signal labeled "RX".

Note that hybrid 32 reflects a portion of the transmit signal back into the receive path as is illustrated by the dash lines in FIG. 2. This represents a near end echo component of the echo. In addition, a corresponding hybrid 52 in CO transceiver 50 also causes echo between the transmit signal and the receive signal as seen from RT transceiver 30, not illustrated in FIG. 2. Thus both these sources of echo are represented in the positive input to summing device 36. In an ideal system, echo canceler 34 would completely cancel out both of these components of echo; in non-ideal systems, a significant amount would remain.

CO transceiver 50 includes hybrid 52, an echo canceler 54, and a summing device 56. Hybrid 52 separates one twisted pair transmission line 40 into a two-wire transmit signal path and a two-wire receive signal path. Echo canceler 54 has a signal input for receiving a transmit signal labeled "TX", and an output. Summing device 56 has a positive input connected to the output of hybrid 52, a negative input coupled to the output of echo canceler 54, and an output terminal for providing a receive signal labeled "RX". Echo canceler 54 must likewise cancel echo that is received along with the far-end signal.

Figure 3:
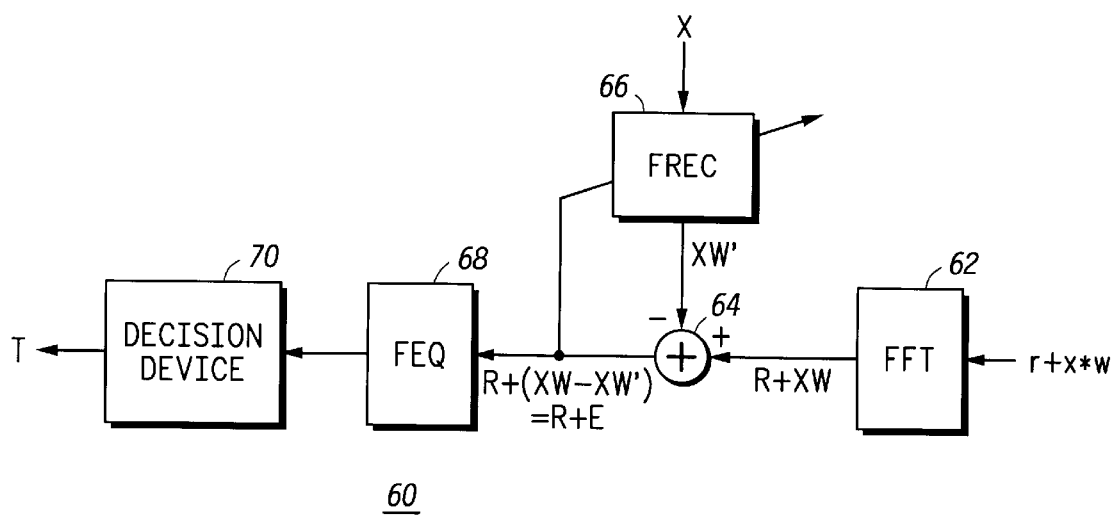
FIG. 3 illustrates, in block diagram form, a known echo canceler for use in an ADSL system.

FIG. 3 illustrates in block diagram form a conventional echo canceler that may be used in RT transceiver 30. Echo canceler 60 was disclosed by Ho et al. in U.S. Pat. No. 5,317,596, entitled "Method and Apparatus for Echo Cancellation with Discrete Multitone Modulation." Echo canceler 60 includes a fast Fourier transform (FFT) 62, a summing device 64, a frequency domain echo canceler (FREC) 66, a frequency domain equalizer (FEQ) 68, and a decision device 70. FFT 62 has an input for receiving a time domain signal labeled "r+x*w", and an output terminal. As illustrated in FIG. 3, signals in lower case represent time domain signals, signals in upper case represent frequency domain signals, and * represents the convolution operation. FFT 62 is a conventional fast Fourier transform block implemented using DSP techniques. FFT 62 converts the time domain input signal to a corresponding frequency domain output signal labeled "R+XW", in which R represents the receive signal, X represents the transmit signal, and W represents the transfer function of the echo channel. Summing device 64 has a positive input connected to the output of FFT 62, a negative input, and an output. FREC 66 has a signal input for receiving a signal labeled "X", a coefficient feedback input connected to the output terminal of summing device 64, and an output connected to the negative input of summing device 64 for providing a signal labeled "XW'". FEQ 68 has an input connected to the output of summing device 64, and an output. Decision device 70 has an input connected to the output terminal of FEQ 68, and an output terminal for providing an estimate of the far-end signal labeled "T".

Together, FREC 66 and summing device 64 provide an echo cancellation function. FFT 62 provides a frequency domain output R+XW. The R component of the signal represents the receive signal, whereas the XW component represents the portion of the transmit signal that is reflected back and thereby forms echo. FREC 66 is an adaptive finite impulse response filter which provides coefficient update using an adaptive least mean squares (LMS) adaptation. It receives transmit signal X and approximates the transfer function W by a value labeled W'. By multiplying input signal X by W' and subtracting that from the frequency domain signal, FREC 66 forms an approximation of the echo signal XW and summing device 64 forms an approximation of the received signal R. However, due to the fact that FREC 66 is not ideal, an additional error component labeled E remains present in the signal. Furthermore, note that the coefficients of FREC 66 are updated in response to the value R+E. Therefore, since signal R only averages to 0 over a long period of time and may not truly have an average value of 0, FREC 66 performs a less than ideal echo cancellation.

FEQ 68 then multiples the receive signal by a value designated "V", which equalizes the signal based on the characteristics of the transmission line. Decision device 70 then converts the signal at the output of FEQ 68 into far-end signal T, which is represented by DMT symbols according to the ADSL standard. Note that FEQ 68 and decision device 70 are part of a conventional DMT receiver and are not used as part of the echo canceller update operation.

Figure 4:
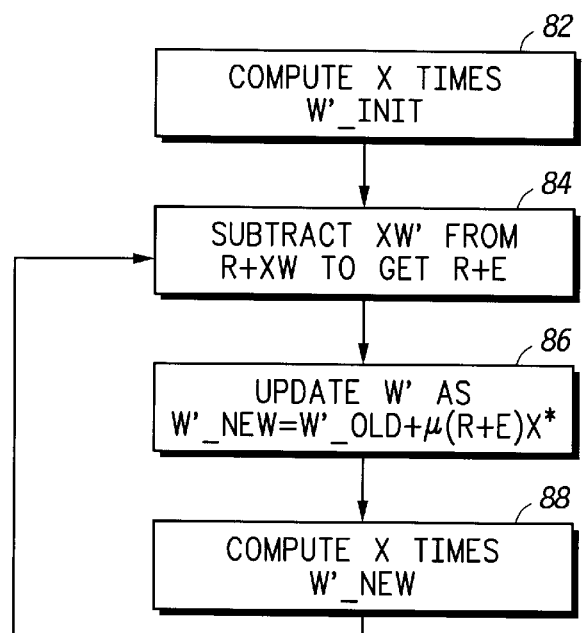
FIG. 4 illustrates a flow diagram associated with the echo canceler of FIG. 3.

The operation of echo canceler 60 is better understood with reference to FIG. 4 which illustrates a flow diagram 80 of echo canceler 60. First, at step 82, echo canceler 60 computes the value of X times a value labeled "W'_INIT". Note that the value of W'_INIT is formed during a training sequence in which the transceiver transmits white noise over the frequency band of interest, thus modeling the echo channel which causes the echo in the system.

Thereafter, the value of W'_NIT is allowed to adapt for subsequent changes in the characteristics of the echo channel. At step 84, the value of X times W' is subtracted from the quantity R+XW to get the quantity of R+E. At step 86, the coefficients of FREC 66 are updated. This operation is represented mathematically as $$W'\_NEW = W'\_OLD + \mu(R+E)X^* \quad [1]$$

wherein $\mu$ represents the adaptation step size and the asterisk represents the complex conjugate operation. Then at step 88, echo canceler 60 again computes the value input to summing device 64 as X times W'_NEW. This method repeats itself starting at step 84 and continues as long as the communications channel remains active.

Figure 5:
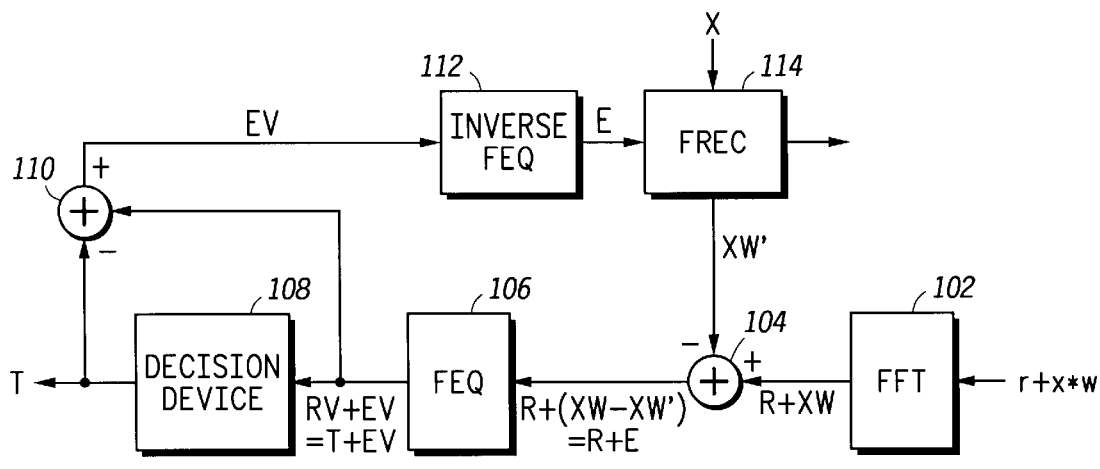
FIG. 5 illustrates, in block diagram form, an adaptive echo canceler according to the present invention.

FIG. 5 illustrates, in block diagram form, an echo canceler 100 according to the present invention. Echo canceler 100 includes an FFT 102, a summing device 104, an FEQ 106, a decision device 108, a summing device 110, an inverse FEQ 112, and an FREC 114. As before, input signal r+x*w is a time domain signal received at an input of FFT 102. Summing device 104 has a positive input connected to the output of FFT 102, a negative input, and an output. FEQ 106 has an input connected to the output of summing device 104, and an output. Decision device 108 has an input connected to the output of FEQ 106 and an output for providing an estimate T of the far-end signal. Summing device 110 has a positive input connected to the output of FEQ 106, a negative input connected to the output of decision device 108, and an output for providing a signal labeled "EV". Inverse FEQ 112 has an input connected to the output of summing device 100, and an output for providing a signal labeled "E". FREC 114 has a signal input for receiving signal X, a coefficient update feedback input for receiving signal E, and an output connected to the negative input terminal of summing device 104 for providing signal XW'.

In operation, many of the blocks of echo canceler 100 function the same way as corresponding blocks of echo canceler 60 of FIG. 3. FFT 102 also receives a time domain signal r+x*w and provides a corresponding frequency domain signal R+XW. Likewise, summing device 104 subtracts an estimate of the frequency domain echo labeled "XW'" from the output of FFT 102 to provide an estimate of the receive signal R plus a residual echo component E associated with the non-ideal nature of FREC 114. FEQ 106 then multiples this signal by an equalizer function V to input to decision device 108.

As before, decision device 108 approximates the symbols associated with the signal present at the input thereof. In addition, a summing device 110 utilizes both the input and the output of decision device 108 to form the value EV. Furthermore, since the equalizer function V is known, inverse FEQ 112 divides the value EV by V to provide an estimate of signal E. FREC 114 uses signal E to adaptively update the estimated echo XW'. Thus, FREC 114 is able to use the true error signal without the presence of the receive signal and thus is able to form a more ideal echo canceler. This more ideal echo canceler is better able to approximate the echo in the receive signal and causes signal E to be smaller and smaller. The smaller value of signal E reduces the likelihood that decision device 108 will misinterpret the presence or absence of an ADSL symbol. Note also that echo canceler 100 is able to track changes in the system and adapt thereto much faster. Thus, at the beginning of operation during which time hybrids 32 and 52 change the most, adaptation time is much quicker. Furthermore, adaptation time is independent of receive signal R. Thus, if R averages 0 only over a very long period of time, adaptation is achieved much more quickly. Also, adaptation works well whether or not R has an average value of 0.

Figure 6:
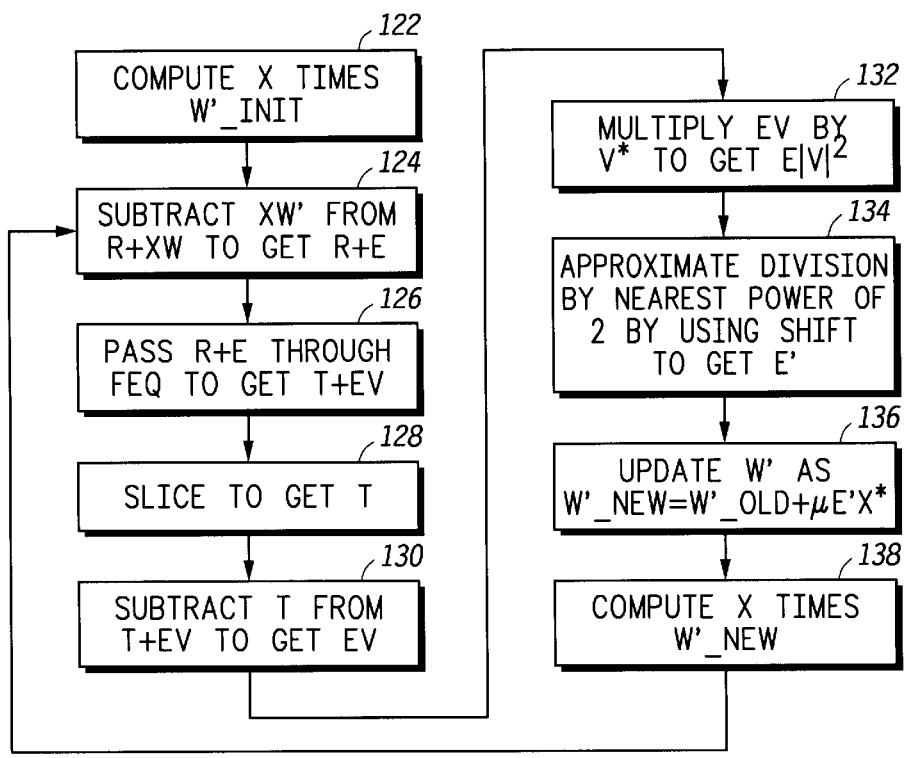
FIG. 6 illustrates a flow diagram associated with the echo canceler of FIG. 5.

The operation of echo canceler 100 of FIG. 5 is more easily understood with reference to FIG. 6, which illustrates a flow diagram associated with echo canceler 100. At a first step 122 the value X times W'_INIT is calculated. As before, this initial transfer function is arrived at through a training sequence that preferably is accomplished by transmitting white noise having relatively uniform energy over the frequency band of interest. Next, at step 124, the quantity XW' is subtracted from R+XW to get R+E. Since echo canceler 100 more accurately updates coefficients by not adapting in response to receive signal R, the value of E will be lower than in conventional echo cancelers. At step 126 the value R+E is input to FEQ 106, the output of which becomes the quantity T+EV. Then, at step 128, decision device 108 forms the value of T by estimating ("slicing") the symbols present in the input thereof. Next, at step 130, the value T is subtracted from the quantity T+EV to get the quantity EV. The equalizer function V is removed by removing phase of the equalizer function V, or both the phase and magnitude of the equalizer function V. At step 132 the value of EV is multiplied by the complex conjugate V* to get the quantity E|V|². Next, at step 134, division is approximated by finding the power of 2 which approximates the quantity |V|² and performing a shift by the number of bit positions corresponding to that power of 2 to get a value labeled E'. This substitution saves computation cycles that would be needed for a true division operation. Note that in other embodiments of echo canceler 100 a true division may be performed, but due to the reduction in computation time, steps 132 and 134 are preferred. Alternatively, the step of shifting by the integer power of 2, in step 134, is performed by incorporating the shift into the adaptation step size value $\mu$. Next, at step 136, FREC 114 adapts using an input value of E'. FREC 114 updates W' according to the following formula:

$$W'\_NEW = W'\_OLD + \mu E'X^* \qquad [2]$$

Note that although the above formula is used in the preferred embodiment, in other embodiments it could be replaced with many other update formulas that adapt filter coefficients based on an error term. Next, at step 138, the value X times W'_NEW is computed. After this step is performed, the flow returns to step 124, and W'_NEW becomes W'_OLD for the next pass.

While the invention has been described in the context of a preferred embodiment, it will be apparent to those skilled in the art that the present invention may be modified in numerous ways and may assume many embodiments other than that specifically set out and described above. For example, the echo canceler of the present invention may be implemented in hardware, in software running on a conventional digital signal processor or some combination thereof. Furthermore, the echo canceler of the present invention is applicable to other discrete multicarrier systems besides the ADSL system described herein. Accordingly, it is intended by the appended claims to cover all modifications of the invention which fall within the true scope of the invention.

What is claimed is:

1. A method of canceling echo in a multicarrier transceiver system including a multicarrier transmitter that transmits signals and a multicarrier receiver that receives signals, the method comprising:

obtaining a frequency domain receive signal R and a residual frequency domain echo component E;

producing, from the receive signal R and the echo component E, a far end transmitted signal T added to an equalized residual frequency domain echo component EV;

estimating the far end transmitted signal T;

subtracting the estimated far end transmitted signal T from the produced far end transmitted signal T added to the equalized residual frequency domain echo component EV, to produce the equalized residual frequency domain echo component EV independent of the far end transmitted signal T;

removing an equalizer function V from the equalized residual frequency domain echo component EV to obtain a residual frequency domain echo component E' for adaptively updating an estimated frequency domain echo signal XW'; and repeating the steps for a plurality of the received signals.

2. The method of canceling echo of claim 1, further comprising:

obtaining a time domain receive signal r and a time domain echo signal x*w; and converting the time domain receive signal r and the time domain echo signal x*w to the frequency domain receive signal R and a frequency domain echo signal XW.

3. The method of canceling echo of claim 1, wherein the step of producing, from the receive signal R and the echo component E, the far end transmitted signal T added to the equalized residual frequency domain echo component EV further comprises:

equalizing the frequency domain receive signal R and the residual frequency domain echo component E.

4. The method of canceling echo of claim 3, wherein the step of equalizing the frequency domain receive signal R and the residual frequency domain echo component E further comprises:

multiplying the frequency domain receive signal R and the residual frequency domain echo component E by a complex number to adjust the phase and magnitude of the frequency domain receive signal R, wherein the far end transmitted signal T added to the equalized residual frequency domain echo component EV is obtained from the adjustment of the phase and magnitude.

5. The method of canceling echo of claim 1, wherein the step of estimating the far end transmitted signal T is performed by a decision device.

6. The method of canceling echo of claim 1, wherein the step of removing the equalizer function V further comprises:

removing the phase of the equalizer function V.

7. The method of canceling echo of claim 6, wherein the step of removing the phase of the equalizer function V further comprises:

multiplying the equalized residual frequency domain echo component EV by the complex conjugate of the equalizer function V to produce an equalized residual frequency domain echo component with a complex conjugate function $E|V|^2$.

8. The method of canceling echo of claim 1, wherein the step of removing the equalizer function V further comprises:

removing the phase of the equalizer function V; and removing the magnitude of the equalizer function V.

9. The method of canceling echo of claim 8, wherein the step of removing the phase of the equalizer function V further comprises:

multiplying the equalized residual frequency domain echo component EV by the complex conjugate of the equalizer function V to produce an equalized residual frequency domain echo component with a complex conjugate function $E|V|^2$.

10. The method of canceling echo of claim 8, wherein the step of removing the magnitude of the equalizer function V further comprises:

multiplying the equalizer function V by the complex conjugate of the equalizer function V to produce a square of the absolute value of the equalizer function $|V|^2$; and approximating the division of the square of the absolute value of the equalizer function $|V|^2$.

11. The method of canceling echo of claim 10, wherein the step of approximating the division of the square of the absolute value of the equalizer function $|V|^2$ further comprises:

finding an integer power of two which approximates the square of the absolute value of the equalizer function $|V|^2$; and shifting the equalized residual frequency domain echo component with a complex conjugate function $E|V|^2$ by said integer power of two.

12. The method of canceling echo of claim 11, wherein the step of shifting by said integer power of two further includes incorporating the shift into a step size value $\mu$.

13. A multicarrier transceiver system including a multicarrier transmitter and a multicarrier receiver comprising:

an echo canceler responsive to a frequency domain transmit signal X and a time domain transmit signal x, and responsive to a frequency domain receive signal R and a frequency domain echo signal XW, for generating a residual frequency domain echo component E independent of the frequency domain receive signal R, for input of said residual frequency domain echo component E to the receiver;

wherein the multicarrier transmitter generates the frequency domain transmit signal X and the time domain transmit signal x, and an output transmit signal for communicating to the multicarrier receiver through a data link;

wherein the multicarrier receiver is responsive to an input receive signal received from the multicarrier transmitter through the data link, and adaptively responsive to the residual frequency domain echo component E for generating the fluency domain receive signal R; and wherein the echo canceler further comprises:

a frequency domain echo canceler subsystem responsive to the frequency domain transmit signal X for producing an estimated frequency domain echo signal XW';

a summing device having a negative input for subtracting the estimated frequency domain echo signal XW' from the frequency domain receive signal R and the frequency domain echo signal XW;

an equalizer for equalizing the frequency domain receive signal R and the residual frequency domain echo component E to produce an equalized output including a far end transmitted signal T added to an equalized residual frequency domain echo component EV;

a decision device for estimating the far end transmitted signal T;

a summing device having a negative input for subtracting the estimated far end transmitted signal T from the equalized output, to produce the equalized residual frequency domain echo component EV independent of the far end transmitted signal T; and an inverse equalizer for removing an equalizer function V from the equalized residual frequency domain echo component EV to obtain a selected one of the residual frequency domain echo component E' or an approximation of the residual frequency domain echo component E' for input to the frequency domain echo canceler subsystem;

wherein the frequency domain echo canceler subsystem adaptively updates the estimated frequency domain echo signal XW'.

14. The method of canceling echo of claim 1, wherein the step of obtaining a frequency domain receive signal R and a residual frequency domain echo component E further comprises:

subtracting the estimated frequency domain echo signal XW' from the frequency domain receive signal R and a frequency domain echo signal XW to produce the frequency domain receive signal R and the residual frequency domain echo component E.

* * * * *